United States Patent
Van Der Horst (10) Patent No.: US 9,479,767 B2
(45) Date of Patent: Oct. 25, 2016

(54) AUTOSTEREOSCOPIC DISPLAY DEVICE AND DRIVE METHOD

(71) Applicant: DIMENCO B.V., Veldhoven (NL)

(72) Inventor: Jan Van Der Horst, Veldhoven (NL)

( * ) Notice: Subject to any disclaimer, the term of this patent is extended or adjusted under 35 U.S.C. 154(b) by 68 days.

(21) Appl. No.: 14/379,081

(22) PCT Filed: Feb. 8, 2013

(86) PCT No.: PCT/EP2013/052599
§ 371 (c)(1),
(2) Date: Aug. 15, 2014

(87) PCT Pub. No.: WO2013/120785
PCT Pub. Date: Aug. 22, 2013

(65) Prior Publication Data
US 2015/0281682 A1 Oct. 1, 2015

(30) Foreign Application Priority Data
Feb. 16, 2012 (GB) .................................. 1202691.0

(51) Int. Cl.
*H04N 13/04* (2006.01)
*H04N 13/00* (2006.01)

(52) U.S. Cl.
CPC ...... *H04N 13/0475* (2013.01); *H04N 13/0014* (2013.01); *H04N 13/0404* (2013.01); *H04N 13/047* (2013.01); *H04N 13/0447* (2013.01); *H04N 13/0454* (2013.01); *H04N 13/0477* (2013.01); *H04N 13/0497* (2013.01); *H04N 13/0409* (2013.01)

(58) Field of Classification Search
CPC ...................... H04N 13/0404; H04N 13/0409; H04N 13/0402; H04N 13/0447; H04N 13/0468; H04N 13/0484; H04N 13/0475; H04N 2013/0465; H04N 13/00; G09G 3/003
USPC .......................... 345/6, 419; 348/169, 51–60; 359/462–467
See application file for complete search history.

(56) References Cited

U.S. PATENT DOCUMENTS

| 5,808,792 A * | 9/1998 | Woodgate .......... G02B 27/0093 348/59 |
| 6,049,424 A | 4/2000 | Hamagishi |
| 7,190,518 B1 | 3/2007 | Kleinberger et al. |

(Continued)

FOREIGN PATENT DOCUMENTS

| EP | 0 726 482 | 8/1996 |
| EP | 2 320 668 | 5/2011 |

(Continued)

OTHER PUBLICATIONS

Neil A. Dodgson, "On the number of viewing zones required for head-tracked autostereoscopic display", Jan. 27, 2006.

*Primary Examiner* — Hong Zhou
(74) *Attorney, Agent, or Firm* — Wood, Phillips, Katz, Clark & Mortimer (57) ABSTRACT

The invention provides an autostereoscopic display device in which a viewer tracking system determines a position of a viewer with respect to the display panel. The display panel is controlled to display a number of different views which is dependent on at least the distance of the viewer from the display panel. This enables the number of views to optimized with respect to the position and/or speed of movement of the viewer.

13 Claims, 8 Drawing Sheets

(56) References Cited

U.S. PATENT DOCUMENTS

| | | | |
|---|---|---|---|
| 2010/0315492 A1 | 12/2010 | Baik et al. | |
| 2011/0006979 A1* | 1/2011 | Min | G02B 27/0093 345/156 |
| 2011/0193863 A1* | 8/2011 | Gremse | G02B 27/225 345/419 |
| 2011/0216061 A1* | 9/2011 | De La Barre | G06T 15/00 345/419 |
| 2011/0234584 A1* | 9/2011 | Endo | G02B 27/017 345/419 |
| 2012/0026164 A1* | 2/2012 | De La Barre | H04N 13/0409 345/419 |
| 2012/0105442 A1* | 5/2012 | Chen | H04N 13/0497 345/419 |
| 2013/0265398 A1* | 10/2013 | Suggs | H04N 13/0402 348/54 |
| 2015/0009304 A1* | 1/2015 | Linge | H04N 13/0406 348/51 |

FOREIGN PATENT DOCUMENTS

| | | |
|---|---|---|
| GB | 2 324 428 | 4/1997 |
| WO | WO 2005/031652 | 4/2005 |
| WO | WO 2009/095862 | 8/2009 |

* cited by examiner

AUTOSTEREOSCOPIC DISPLAY DEVICE AND DRIVE METHOD

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of an imaging arrangement for use in this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceive a stereo image in his/her eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. In the case of an n-view 3D display with vertical lenticular lenses, the perceived resolution of each view along the horizontal direction will be reduced by a factor of n relative to the 2D case. In the vertical direction the resolution will remain the same. The use of a barrier or lenticular that is slanted can reduce this disparity between resolution in the horizontal and vertical direction. In that case, the resolution loss can be distributed evenly between the horizontal and vertical directions.

The individual views are each in so-called viewing cones, and these viewing cones typically repeat across the field of view.

The viewing experience is hampered by the fact that the viewers are not entirely free in choosing their location from which to view a 3D monitor or television: at the boundaries between viewing cones the 3D effect is absent and annoying ghost images appear.

These so-called cone transitions represent a first problem with known autostereoscopic displays. It is known to use head tracking to track the position of the eyes of a viewer. The displayed images can then be controlled in dependence on the viewer position, so that viewing cone transitions are avoided Another problem is that various formats exist for the stereo image content. Most content is currently provided as two separate image, in a two view stream. Most multi-view displays are not suitable for a two view stream unless a digital conversion based on depth estimation is used to interpolate new views. Similarly, two view displays can only be used with a two view stream and cannot be configured for multiple viewers. The 3D perception is then only possible within a very narrow range of viewing distance.

There is therefore a need for a system which is more flexible.

SUMMARY OF THE INVENTION

According to the invention, there is provided an autostereoscopic display device and method as claimed in the independent claims.

In one aspect, the invention provides an autostereoscopic display device comprising:

a pixellated display panel;

an imaging arrangement for directing the light associated with different display pixels of the display panel to different directions, such that at least three viewing areas are defined to which different images can be displayed simultaneously;

a viewer tracking system for tracking a viewer and determining a position of a viewer with respect to the display panel;

a processor for processing image content and to drive the display panel, wherein the processor drives the display panel to display a number of different views which is dependent on at least the distance of the viewer from the display panel.

This arrangement enables the way views are allocated to the different viewing locations (as defined by the physical/optical design of the display) to be dynamically controlled in dependence on the position of a viewer. This enables the image sharpness to be increased, and it enables cone boundary transitions to be avoided. When view overlap is high, for example if an object is imaged far in front of behind the original display plane, the sharpness deteriorates. Reducing the number of different views within a cone reduces this view overlap.

For a first viewing distance, a first number of views can be displayed, and for a second, greater, viewing distance, a second, greater, number of views is displayed.

This enables a display to be switched between a two view mode for example (a single autostereoscopic view mode) for a single close up viewer to a multiple view mode (i.e.

multiple autostereoscopic views) for multiple viewers or a distant viewer. For a viewing distance below a threshold, a total of two views is displayed.

The views can be repeated in multiple display output cones, and the distance threshold can be such that the cone width at that distance is less than a threshold which is in the range 15 cm to 40 cm. This means the cone width is a small number of times greater than the eye separation of the viewer, for example 3 to 4 times.

The processor can also be adapted to derive a speed of movement of the viewer, and if the speed exceeds a first threshold, the number of different views is set to 1. This means if the viewer is moving too fast for the multiple views to be reliably positioned, a 2D mode can be enabled. Also, if the speed exceeds a threshold (the same or different), the ordering of the different views can be changed to soften the visibility of cone transitions, for example when it is detected that the viewer is moving faster then a tracking system can follow. The issue of cone transitions is for example discussed in WO2005091050.

Within each viewing cone, a first set of views can each be displayed in only one viewing area and a second set of views can each be displayed at least in two adjacent viewing areas. Views that are not visible to the user (which is known based on the viewer position) can be provided with images which are repeats of those that can be seen by the viewer, and this again reduces the number of views and thereby reduces crosstalk and increases sharpness.

In another aspect, the invention provides a method of driving an autostereoscopic display device comprising:

directing the light associated with different display pixels of a pixellated display panel to different directions, such that at least three viewing areas are defined to which different images can be displayed simultaneously;

tracking a viewer and determining a position of the viewer with respect to the display panel;

processing image content and driving the display panel to display a number of different views which is dependent on at least the distance of the viewer from the display panel.

The invention can be implemented as a computer program adapted to process the image data before driving the display panel.

BRIEF DESCRIPTION OF THE DRAWINGS

An embodiment of the invention will now be described, purely by way of example, with reference to the accompanying drawings, in which.

DETAILED DESCRIPTION

The invention provides an autostereoscopic display device in which a viewer tracking system determines a position of a viewer with respect to the display panel. The display panel is controlled to display a number of different views which is dependent on at least the distance of the viewer from the display panel. This enables the number of views to optimised with respect to the viewer position and optionally also the speed of movement of the viewer.

The known autostereoscopic display design will first be described.

Figure 1:
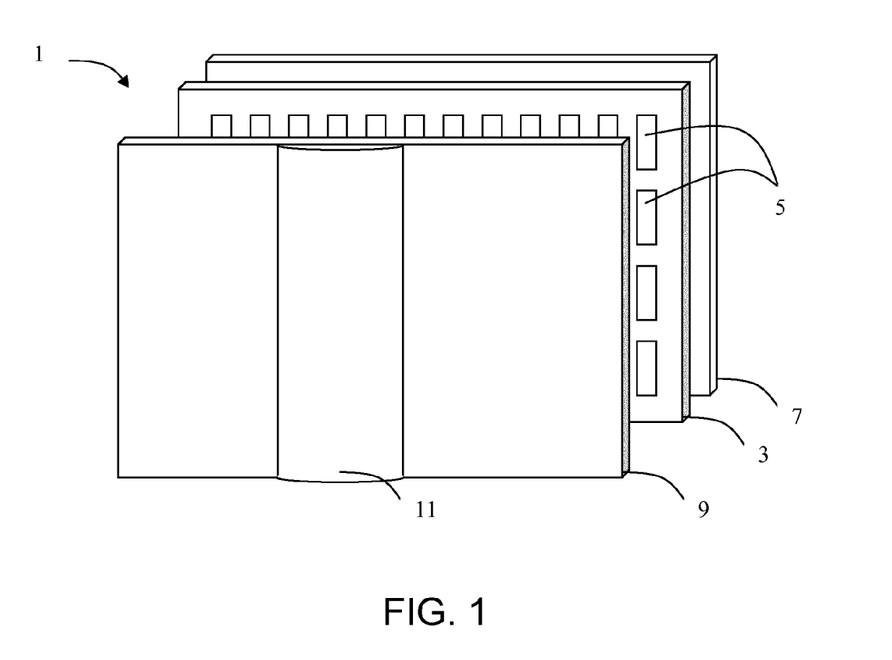
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

Figure 2:
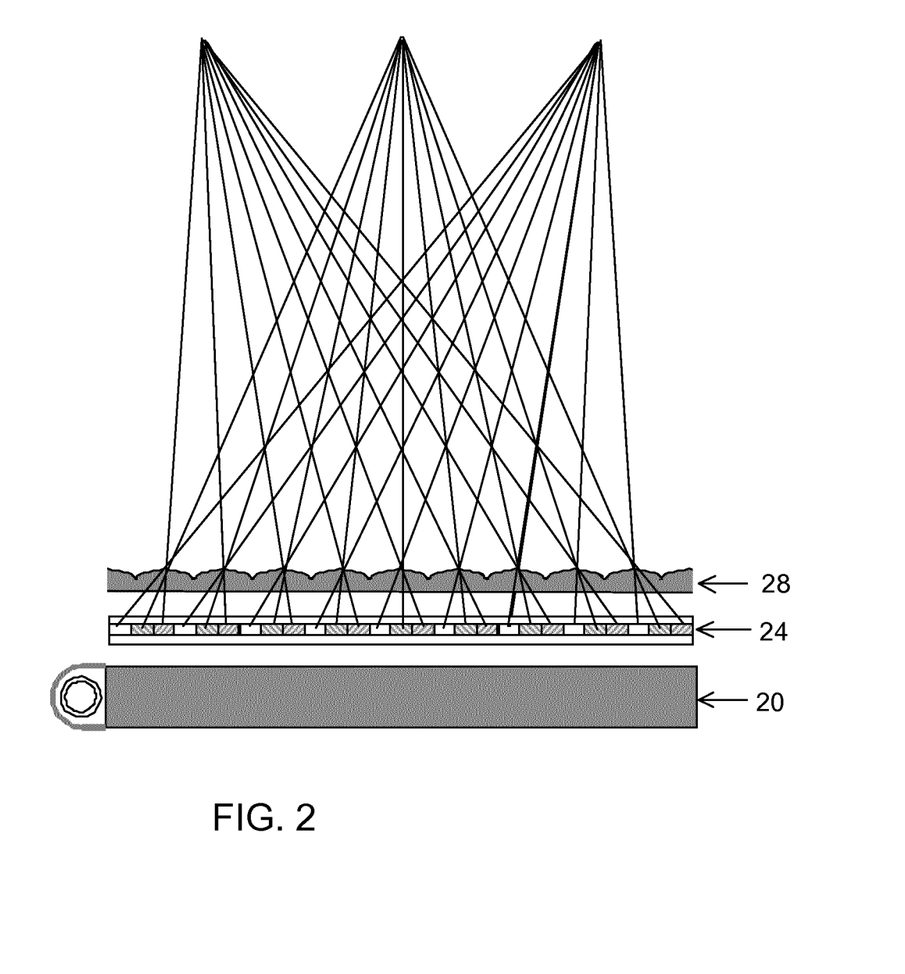
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28. FIG. 2 shows how the lenticular arrangement 28 directs different pixel outputs to three different spatial locations.

Figure 3:
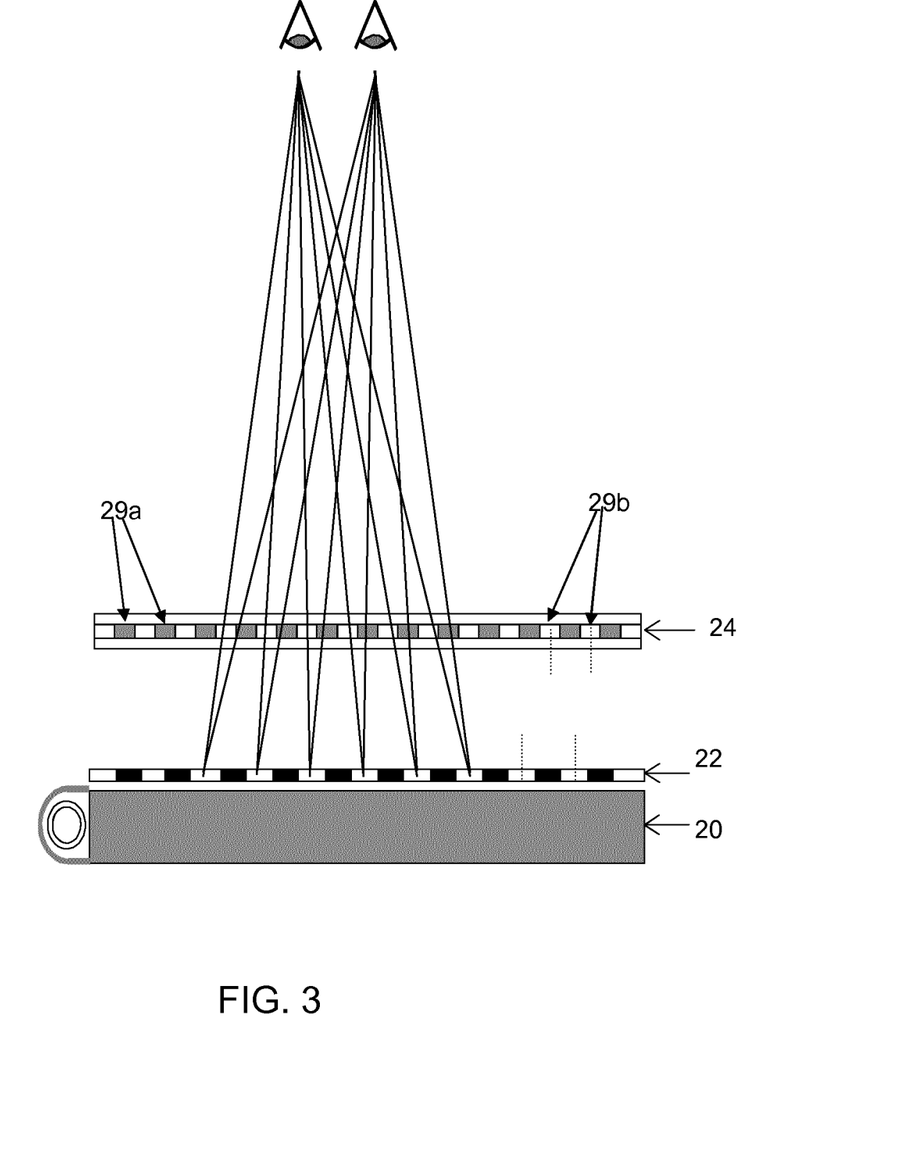
FIG. 3 shows how a barrier arrangement provides different views to different spatial locations.

FIG. 3 shows the principle of operation of a barrier type imaging arrangement showing the backlight 20, barrier device 22 and display device 24 such as an LCD. FIG. 3 shows how the barrier device 22 provides a patterned light output. This means that different pixels are illuminated by discontinuous light source regions, with the effect that a light directing function is implemented. As shown, pixels 29a for one view are illuminated from one direction and pixels 29b for another view are illuminated from another direction. The two eyes of the viewer receive light modulated by different pixels of the display.

This invention is in part concerned with the problem of view repetition, which is explained below.

Figure 4:
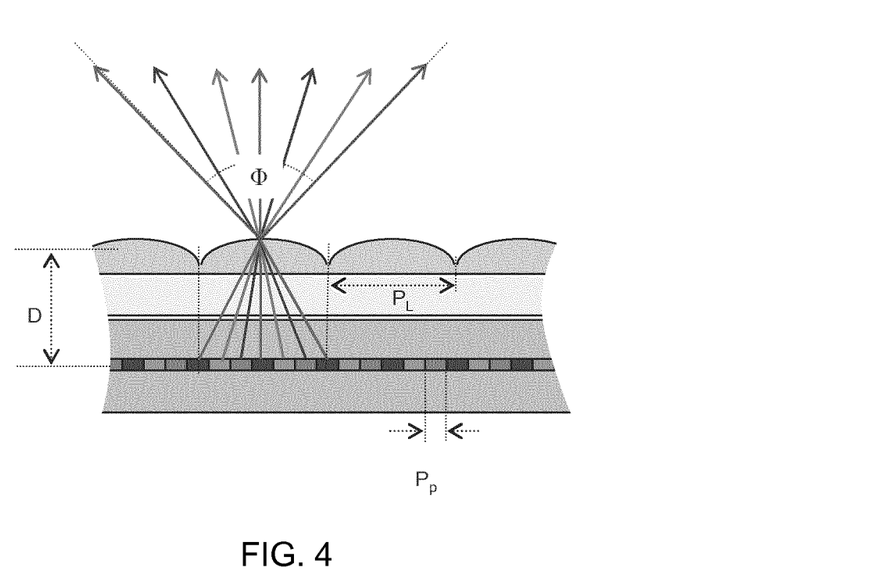
FIG. 4 shows a cross-section of the layout of a multi-view autostereoscopic display.

FIG. 4 shows a cross-section of the layout of a multi-view autostereoscopic display. Each pixel underneath a certain lenticular lens will contribute to a specific view. All pixels underneath this lens will together contribute to a cone of views. The width of this cone is determined by the combination of several parameters: it depends on the distance D from the pixel plane to the plane of the lenticular lenses. It also depends on the lens pitch $P_L$.

Figure 5:
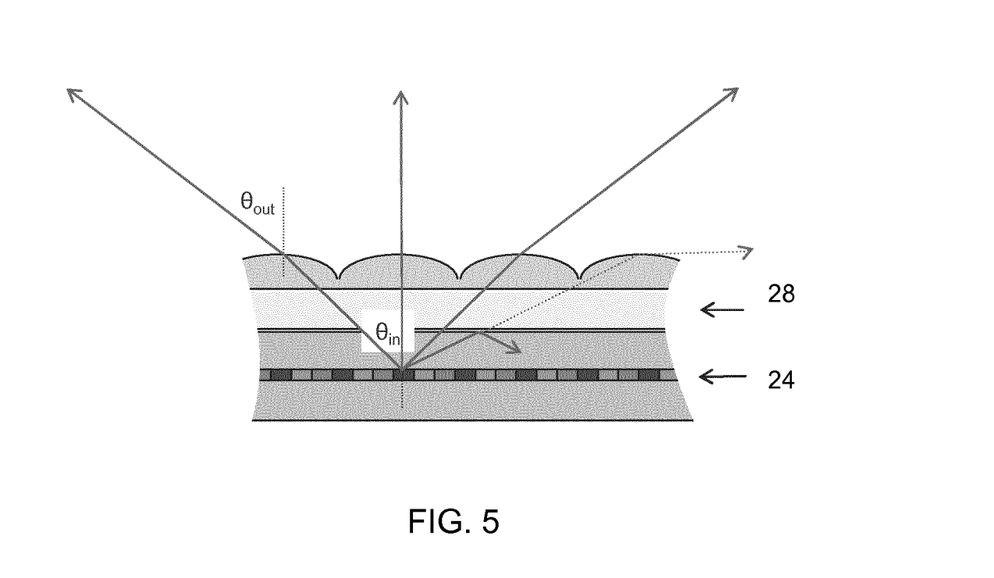
FIG. 5 is a close-up of FIG. 4.

FIG. 5 is a close-up of FIG. 4, and shows that the light emitted by a pixel of the display 24 is collected by the lenticular lens closest to the pixel but also by neighbouring lenses of the lenticular arrangement. This is the origin of the occurrence of repeated cones of views.

The dependence of the anglesize of a cone, φ, on these parameters is governed by the relation (by approximation):

$$\Phi = 2\arctan\left[\frac{nP_L}{2D}\right].$$

In this expression, n is the average index of refraction of the materials in between the pixel plane and the plane of the lenticular lenses (typically, n is typically in the range from 1.0 (air) to 1.6). $P_L$ is the pure horizontal pitch, D is the distance from the lens base to the pixel structure.

Note that the smaller the angular spacing between two views, the higher the 3D effect but the lower the freedom of movement.

Figure 6:
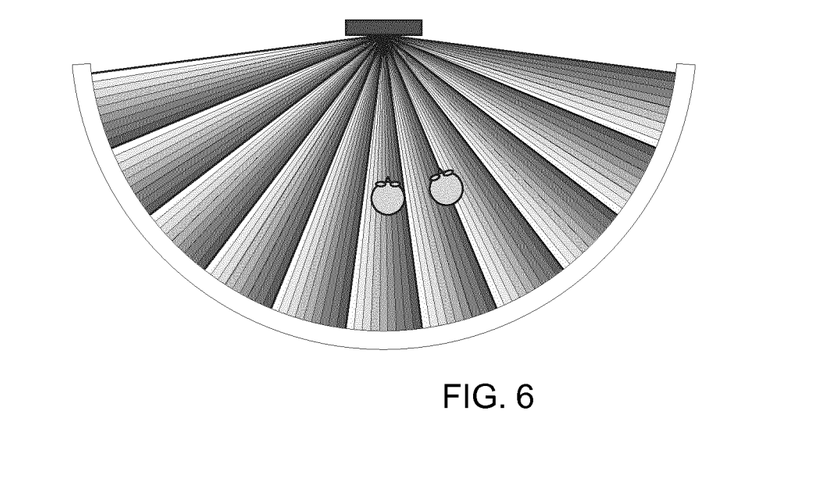
FIG. 6 shows a 9-view system in which the views produced in each of the sets of cones are equal.

The corresponding views produced in each of the cones are equal. This effect is schematically shown in FIG. 6 for a 9-view system (i.e. 9 views in each cone).

For an acceptable compromise between 3D effect and resolution penalty, the total number of views is limited to typically 9 or 15. These views have an angular width of typically 1°-2°. The views and the cones have the property that they are periodic. If the user walks around the display he will cross the boundaries between adjacent viewing cones. In a certain region the images in both eyes will not properly match, as for the viewer shown to the right in FIG. 6. In the case of e.g. a 9-view system the left eye will receive e.g. the $9^{th}$ image and the right eye will receive e.g. the $1^{st}$ image. First of all, the left and right images are reversed, which means that the image is pseudoscopic. Secondly, and more severe, there is a very large disparity between the images. This is referred to as "super pseudoscopic" viewing. As the viewer moves across the cone boundaries very annoying discontinuous jumps are observed.

Only a viewer located entirely within a certain cone (for example the viewer to the left in FIG. 6) will experience a 3D effect since the views that are directed towards his left and right eye then slightly differ (e.g. views 4 and 5 for the left and right eye, respectively).

The invention uses a viewer tracking system to track at least the position of the viewer (and thereby derive the distance from the display screen) and optionally also the speed of movement of the viewer, particularly in a lateral direction.

Figure 7:
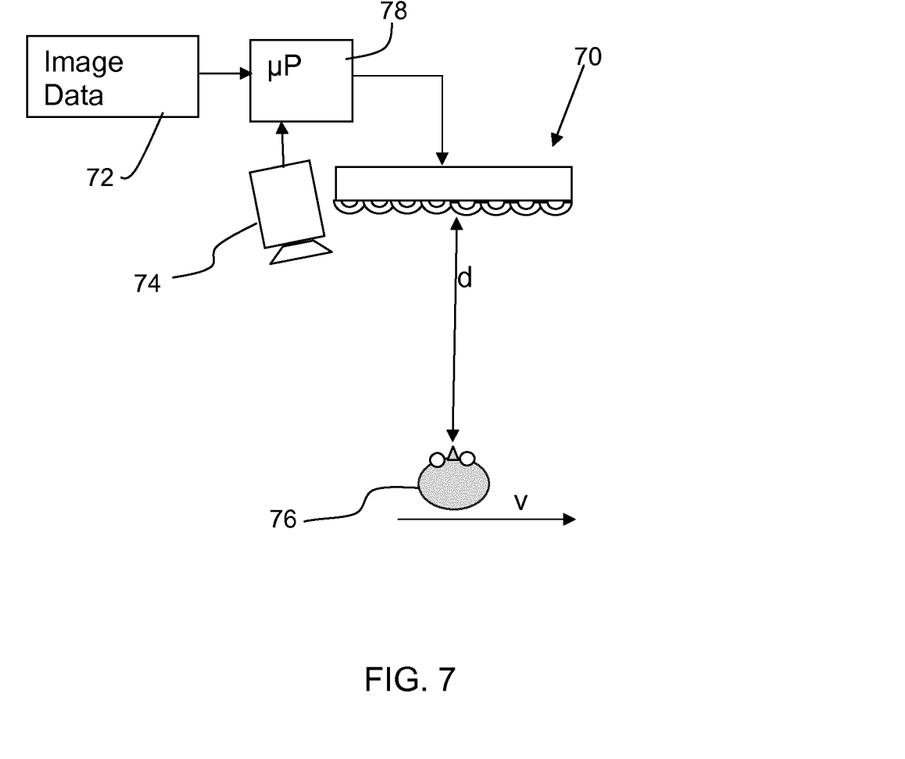
FIG. 7 shows an example of display device of the invention.

The system of the invention is shown in schematic form in FIG. 7.

The autostereoscopic display 70 is designed to display a plurality of views in repeating image cones (for example as shown in FIG. 6).

Image data 72 is received. This may comprise two-view image data, in which case the display can be driven in a two-view mode. Alternatively, additional views can be interpolated by image processing techniques.

Preferably, however, the image data is provided in the form of a number of different views corresponding to the number of views per viewing cone which the display 70 is designed for.

A viewer tracking system 74 is provided. This is able to determine at least the distance d of the viewer 76 from the display panel, but optionally also the viewer speed of movement v, at least the component thereof in a lateral direction as shown.

The image data is processed by a processor 78 before driving the display 70 using the viewer tracking information obtained.

The system of the invention enables the number and order of the views displayed to be varied based on the position and/or moving speed of the viewer.

The viewer tracking system 74 can be a face or person tracking system able to measure the position and size of a face in a recorded image or video. The tracking system can derive the distance d of the viewer for example by measuring the eye distance, or by analysing the viewer's face using a stereo camera. The viewer tracking system can for example be based on an image processing face tracking algorithm, a radar system, a system based on wearable indicators, an infrared red eye generator and detector.

Any known face tracking, body tracking or distance measuring system can be used, that enables at least the distance d to the viewer to be determined.

The physical design of the display 70 is not altered by the system of the invention. Thus, the methods which can be implemented by the invention are based on image processing and display driving.

The system of the invention controls the allocation of images to the different viewing areas defined by the physical design of the display 70. For example, a lower number of views can be displayed by providing identical image content to two viewing areas—which would have different images applied if the maximum number of views were to be displayed.

In general, lowering the number of views displayed by a certain display design increases the sharpness of a 3D image, at the cost of freedom of movement and possible number of viewers. By tracking the user of a display and in particular the distance of a viewer, the optimal number of different images for the user can be determined.

The cone width $W_C$ of an autostereoscopic display depends on the optics and the viewing distance $D_V$ for which the display is designed. The optics define the angle size of the cone as explained above. The width of the viewing cone is given by:

$$W_C = 2 * D_V \tan \phi/2$$

This relation links the anglesize to the actual width at viewing distance Dv.

The system of the invention can be controlled to implement various possible methods, described below.

A first example is explained with reference to FIGS. 8 and 9, in which the closer the viewer is to the display, the lower the number of images presented by the display.

Figure 8:
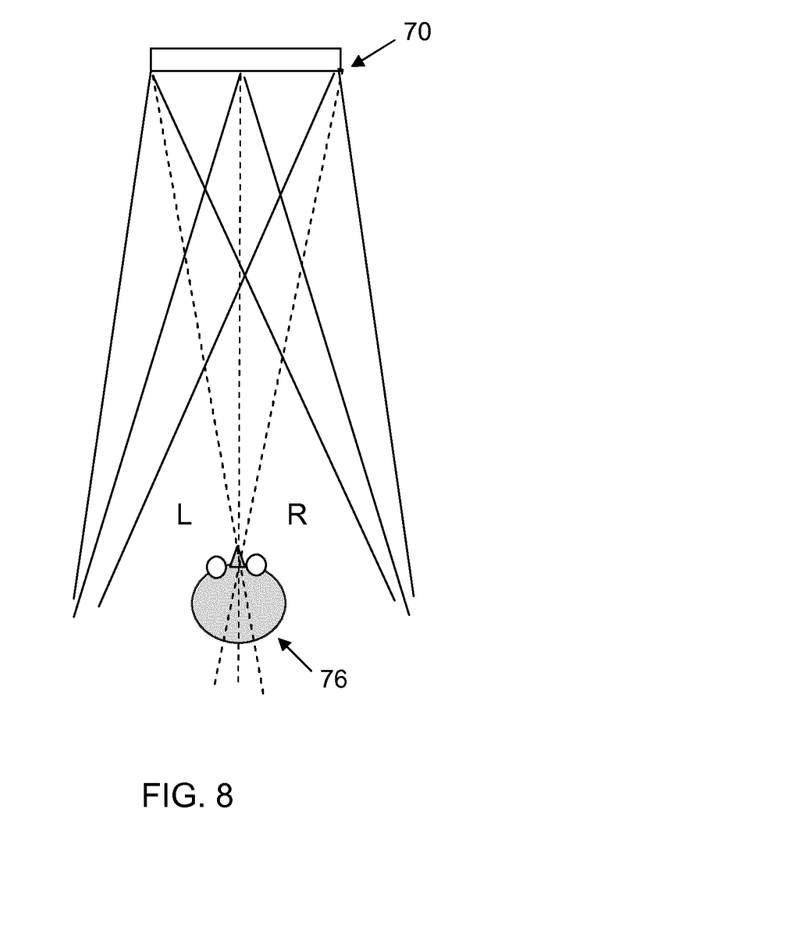
FIG. 8 shows a first example of how the display device of the invention can control the display output.

FIG. 8 shows a viewer close to the display, and the display is configured to display only two views (right R and left L). To display two views, the two views are repeated in the various viewing areas within each cone. For example if the display optics are designed as a nine-view system, five/four left views and four/five right views can be displayed. This does not increase the resolution of the views, but it does reduce cross talk and thereby reduce image blurring.

The display can be switched to the two view mode when the viewing distance is lower than a threshold. For example, mode switching can take place if the viewing distance d is such that the eye separation is greater than 0.25 times the cone width at that viewing distance. If the ratio becomes smaller than 0.25 the display can be switched to an autostereoscopic mode with more than two views. The threshold of 0.25 can be different, for example between 0.2 and 0.3 or even between 0.1 and, 0.5.

Based on the threshold of 0.25, the following relationships hold:

$$N_V = 2 \text{ if } E/W_C > 0.25$$

$$N_V > 2 \text{ if } E/W_C <= 0.25$$

where $N_V$ is the number of views and E is the eye separation.

A fixed eye separation can be assumed, for example 6 cm. In this case, the cone width threshold $W_C$ is 24 cm. This threshold may be anywhere between 15 and 40 cm for example.

Figure 9:
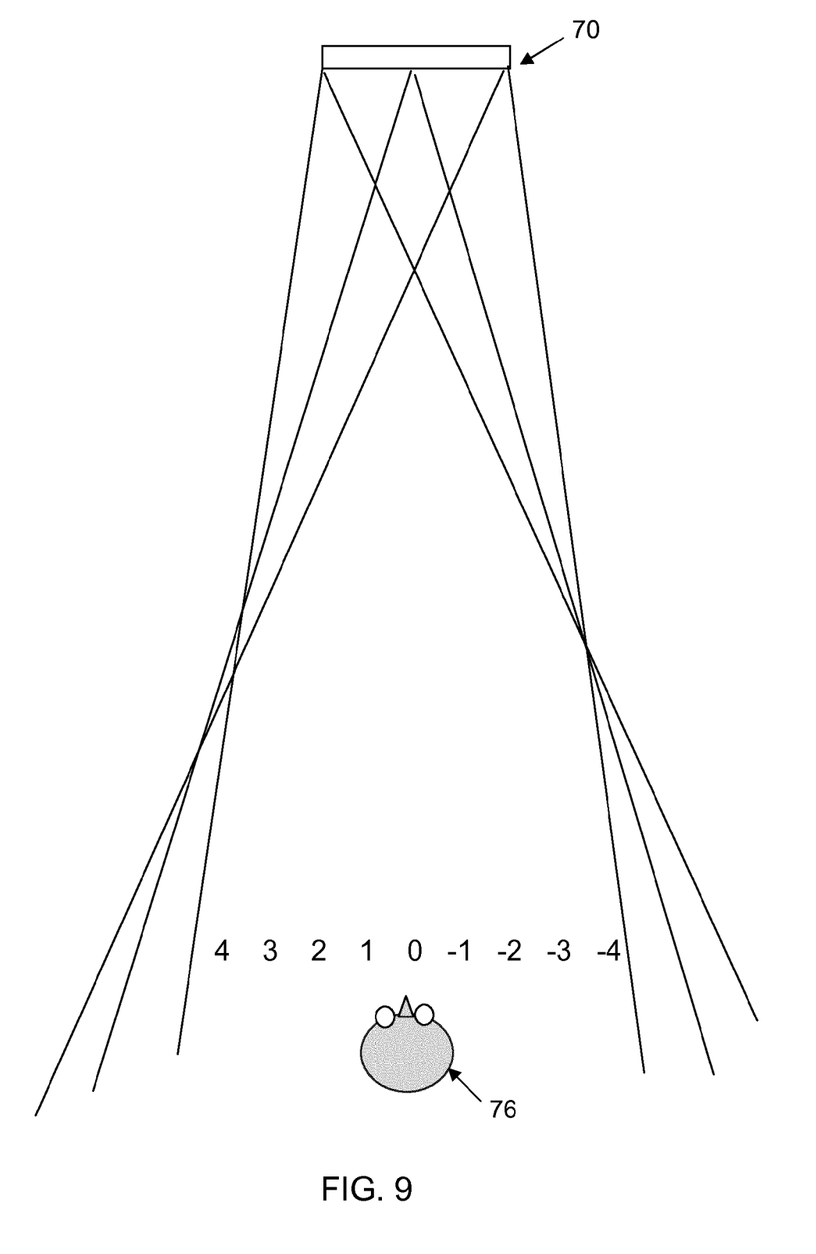
FIG. 9 shows a second example of how the display device of the invention can control the display output.

FIG. 9 shows the display with a viewer further from the display, and thereby operated in the multiple view mode. Nine different views (numbered −4 to +4) are shown.

The system can also be used to detect the speed of movement of the viewer. When the viewer moves at a speed higher than a tracker can follow, the display can again switch to a single view mode (a 2D mode) so that it is prevented that the user will see a left-right inverted image when cone boundaries are passed.

Another use of speed tracking is to change the order of viewpoints across the cone width, to a non-linear order, when the movement is faster than the a tracker can follow. This can be carried out to soften the visibility of cone transitions. For example a view order (for a nine view system) within the cones could be −1 −3 −2 −1 0 1 2 3 1 instead of −4 −3 −2 −1 0 1 2 3 4 as shown in FIG. 9.

In this way, the possibility of seeing views 4 and −4 is avoided at the cone boundary. Instead of this nine view difference, the largest difference in view number is 2 (views 3 and 1 within the viewing cone or views 1 and −1 at the cone boundary.

Thus the largest difference in view number of adjacently displayed views can be set to be 2.

The display can be designed so that the viewing distance compensation is most effective. For example, the display can be designed such that at a default viewing distance (for which the display is designed), the cone width is smaller than 4 times the eye distance E, for example less than 30 cm. The cone width can be designed to be smaller than 3 times the eye distance E, which will correspond to around 20 cm. The default viewing distance can for example be equal to 2 times the display width.

In this way, the distance system will switch to a two-view mode when the viewer is at the designed distance from the display, and will only give more views when the viewer is further away. The default distance is thus for a single close up view, using the display as a monitor, but the display can be used at a larger viewing distance by multiple users A further way of using the system of the invention is explained with reference to FIG. 10.

Figure 10:
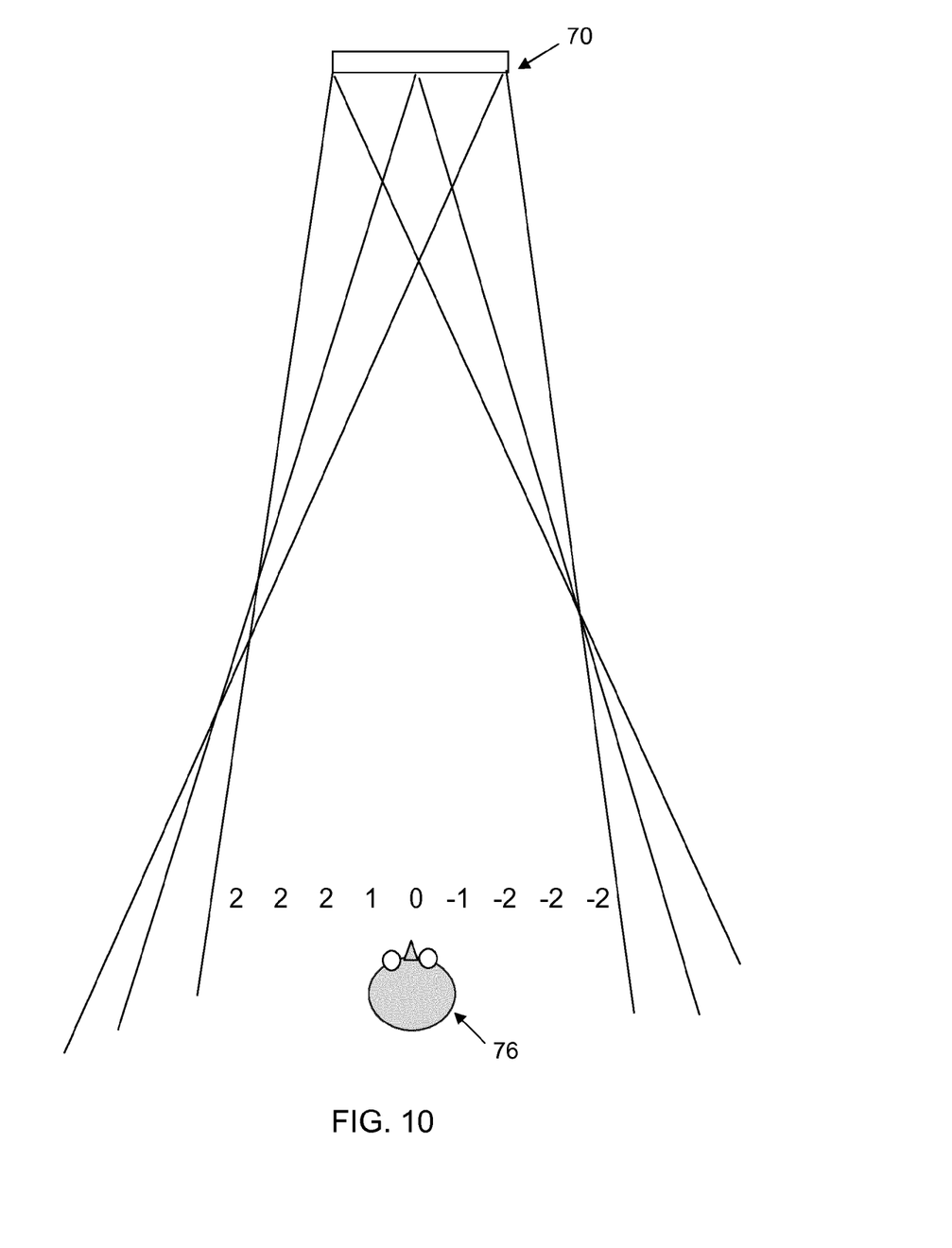
FIG. 10 shows a third example of how the display device of the invention can control the display output.

In this case, there are more than two views but less than the maximum possible number (nine in the example shown). The amount of visible crosstalk is reduced by setting the views within a cone which are not visible to the viewer (even if they move slightly) to be the same as the views which are visible to the viewer. In this way, a first set of views is displayed in only one viewing area each (views 1, 0 and −1) and a second set of views (views 2 and −2) are displayed at least in two adjacent viewing areas each.

In the example shown, the central views are displayed once, and the lateral edge views are displayed three times.

However, this depends on the position of the viewer. For example the images directed to the viewer (but allowing a limited range of movement) can all be presented once, and the remaining viewing locations can be provided with identical views. This will typically give two or three images displayed once (three in the example shown −1, 0, −1) and only two other images used for all other views (2, −2).

In this way, the images displayed within a cone are selected depending on the relative position of the viewer within the cone.

The invention is especially applicable to monitor sized displays which can switch between a mode for multiple viewers at larger distance and a configuration where one viewer is using the display from close-by where the display will switch to the sharpest mode possible: a two-view system.

When there are multiple viewers, the viewer tracking system can look for the closest viewer to the display, and use this closest viewer to judge whether to switch display mode. Alternatively, the display can remain in multiple view mode whenever more than one viewer is detected, and only switch to the two view mode when there is a single viewer being tracked, and when that single viewer is close to the display panel.

The invention can be used in barrier or lenticular systems, or indeed other optical systems, for example using microlenses.

There may also be a manual override to enable the user to select between the two view and multiple view modes.

The invention has been described in connection with an LCD display, but it can be applied to other display technologies, such as OLED displays.

If the input data to the system includes only two views (rather than 2D and depth information, or multiview images), the system can include stereo to multiview conversion.

When the input data to the system is 2D and depth information, the depth information can be scaled when the display is switched to a low number of views or to the stereo (2 view) mode. For example the generated disparity differences can be made at least 20% larger to increase the depth effect.

When the input data to the system is multiview images, there is a choice of which pair of views to use for the stereo (2 view) mode. Views which can for example be chosen which are further apart than in normal configuration. For example, views 0 and 1 would normally projected to the left and right. Instead, views 0 and 2, or 0 and 3 could be selected. Even views −3 and 3 could be used. These are options because the crosstalk in the views is no longer a limiting factor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
    a pixelated display panel;
    an imaging arrangement for directing the light associated with different display pixels of the display panel to different directions, such that at least three viewing areas are defined to which different images can be displayed simultaneously wherein the viewing areas are formed in display output viewing cones each having a cone width, wherein the viewing cones repeat across a field of view;
    a viewer tracking system for tracking a viewer and determining a position of a viewer with respect to the display panel;
    a processor for processing image content and to drive the display panel, wherein the processor drives the display panel to display a number of different views within each viewing cone which is dependent on at least a distance of the viewer from the display panel,
    wherein for a first viewing distance below a distance threshold, a total of two views are displayed, and for a second, greater, viewing distance, a second, greater, number of views is displayed, wherein the distance threshold is such that the cone width at that distance is less than a threshold which is in the range 13 cm to 40 cm.

2. A device as claimed in claim 1, wherein the processor is adapted to derive a speed of movement of the viewer, and wherein if the speed exceeds a first threshold, the number of different views is set to 1.

3. A device as claimed in claim 2, wherein the processor is adapted to derive a speed of movement of the viewer, and wherein if the speed exceeds a second threshold, the ordering of the different views is changed.

4. A device as claimed in claim 1, wherein within each viewing cone there is a plurality of viewing areas to which different images can be displayed simultaneously, and wherein a first set of views are each displayed in only one viewing area and a second set of views are each displayed in at least two adjacent viewing areas.

5. A device as claimed in claim 1, wherein the cone width at a viewing distance equal to two times a display panel width is less than 30 cm, and more preferably less than 20 cm.

6. A method of driving an autostereoscopic display device comprising:
    directing the light associated with different display pixels of a pixelated display panel to different directions, such that at least three viewing areas are defined to which different images can be displayed simultaneously, wherein the viewing areas are formed in display output viewing cones each having a cone width, wherein the viewing cones repeat across a field of view;
    tracking a viewer and determining a position of the viewer with respect to the display panel;
    processing image content and driving the display panel to display a number of different views within each viewing cone which is dependent on at least a distance of the viewer from the display panel,
    wherein for a first viewing distance below a distance threshold, a total of two views are displayed, and for a second, greater, viewing distance, a second, greater, number of views is displayed, wherein the distance threshold is such that the cone width at that distance is less than a threshold which is in the range 13 cm to 40 cm.

7. A method as claimed in claim 6 comprising deriving a speed of movement of the viewer, wherein if the speed exceeds a first threshold, the number of different views is set to 1.

8. A method as claimed in claim 7 comprising deriving a speed of movement of the viewer, wherein if the speed exceeds a second threshold, the ordering of the different views is changed.

9. A method as claimed in claim 6, wherein within each cone there is a plurality of viewing areas to which different images can be displayed simultaneously,
    wherein the method comprises displaying a first set of views each in only one viewing area and displaying a second set of views each in at least two adjacent viewing areas.

10. A computer program product for driving an autostereoscopic display device, the computer program product comprising a non-transitory computer readable storage medium having program instructions embodied therewith, the program instructions executable by a computer to perform a method comprising:
    directing light associated with different display pixels of a pixelated display panel to different directions, such that at least three viewing areas are defined to which different images can be displayed simultaneously, wherein the viewing areas are formed in display output viewing cones each having a cone width, wherein the viewing cones repeat across a field of view;
    tracking a viewer and determining a position of the viewer with respect to the display panel; and
        processing image content and driving the display panel to display a number of different views within each viewing cone which is dependent on at least a distance of the viewer from the display panel,
    wherein for a first viewing distance below a distance threshold, a total of two views are displayed, and for a second, greater, viewing distance, a second greater, number of views is displayed, wherein the distance threshold is such that the cone width at that distance is less than a threshold which is in the range 13 cm to 40 cm.

11. A computer program product as claimed in claim 10, wherein the method comprises deriving a speed of movement of the viewer, wherein if the speed exceeds a first threshold, the number of different views is set to 1.

12. A computer program product as claimed in claim 10, wherein the method comprises deriving a speed of movement of the viewer, wherein if the speed exceeds a second threshold, the ordering of the different views is changed.

13. A computer program product as claimed in claim 10, wherein within each cone there is a plurality of viewing areas to which different images can be displayed simultaneously,
   wherein the method comprises displaying a first set of views each in only one viewing area and displaying a second set of views each in at least two adjacent viewing areas.

\* \* \* \* \*